US006922486B2

(12) United States Patent
Risson

(10) Patent No.: US 6,922,486 B2
(45) Date of Patent: Jul. 26, 2005

(54) PROCESS OF IDENTIFICATION OF SHADOWS IN AN IMAGE AND IMAGE OBTAINED USING THE PROCESS

(75) Inventor: Valery J. Risson, Paris (FR)

(73) Assignee: Eastman Kodak Company, Rochester, NY (US)

( * ) Notice: Subject to any disclaimer, the term of this patent is extended or adjusted under 35 U.S.C. 154(b) by 562 days.

(21) Appl. No.: 10/184,270

(22) Filed: Jun. 27, 2002

(65) Prior Publication Data

US 2003/0016863 A1 Jan. 23, 2003

(30) Foreign Application Priority Data

Jul. 5, 2001 (FR) .............................. 01 08907

(51) Int. Cl.[7] .............................................. G06K 9/34
(52) U.S. Cl. ...................... 382/164; 382/167; 382/274; 358/538; 358/461
(58) Field of Search ................................ 382/162, 163, 382/164, 165, 166, 167, 174, 274; 358/538, 461, 520–523; 348/251, 254, 673, 687, 234–235, 236, 633, 369.1; 345/20, 63, 77, 596–599, 690–697

(56) References Cited

U.S. PATENT DOCUMENTS

| | | | |
|---|---|---|---|
| 6,346,994 B1 * | 2/2002 | Inoue ........................ | 358/1.9 |
| 6,463,173 B1 * | 10/2002 | Tretter ........................ | 382/168 |
| 2001/0053286 A1 * | 12/2001 | Cannata et al. ............. | 396/310 |
| 2002/0067626 A1 * | 6/2002 | Koike et al. ............. | 363/21.12 |

OTHER PUBLICATIONS

Salvador E. et al., "Shadow identification and classification using invariant color models" 2001 IEEE International Conference on Acoustics, Speech, and Signal Processing Proceedings, vol. 3, May 7–11, 2001, pp. 1545–1548, XP002203786.

Funka–Lea G. et al. "Combining Color and Geometry for the Active, Visual Recognition of Shadows" Proceedings of the Fifth International Conference on Computer Vision. Cambridge, MA., Jun. 20–23, 1995, Proceedings of the International Conference on Computer Vision, Los Alamitos, IEEE Comp. Soc. Press, US, vol. conf. 5, Jun. 20, 1995, pp. 203–209, XP000557069.

* cited by examiner

Primary Examiner—Kanjibhai Patel
Assistant Examiner—Ali Bayat
(74) Attorney, Agent, or Firm—David A. Novais

(57) ABSTRACT

The invention relates to a process of shadow identification in a digital image. The digital image comprises a set of image points that can be located in a plane of the image, with each image point being associated with a color and brightness. The color is defined by chromatic components that can be located in the color space of an acquisition system, and the brightness is determinable from the chromatic components. According to the process of the present invention, for each image point, the brightness is determined; color standardization is carried out, leading to standardized chromatic components r, g, b; a chromatic brightness is determined from the standardized chromatic components r, g, b; and the chromatic brightness is compared with the brightness, to identify the presence of a shadow on the relevant image point.

12 Claims, 3 Drawing Sheets

PROCESS OF IDENTIFICATION OF SHADOWS IN AN IMAGE AND IMAGE OBTAINED USING THE PROCESS

This is a U.S. original application which claims priority on French patent application No. 0108907 filed Jul. 5, 2001.

FIELD OF THE INVENTION

The invention relates to the technical field of processing digital or digitized images. More specifically, the invention relates to a process that enables shadow zones to be identified in an image.

BACKGROUND OF THE INVENTION

In the field of the digital interpretation of images associating the presence of shadows and light, two development directions can be seen. The first relates to the detection, and more especially, object identification in an image despite the presence of shadows. The second aims, more especially, to identify and interpret the shadow zones of an image, independently of the objects.

The first development direction is based on the assumption that an object can be recognized by its color, independently of whether or not this object is shadowed. The methods developed on the basis of this visual assessment are not always satisfactory, especially when there are significant image illumination contrasts.

The second development direction is more in line with an object of the invention that includes identifying the shadows in an image.

One well-known approach involves identifying in an image, the limits of an object bordered by a dark zone contrasting with the color of the object. However, this method enables identification of only a part of the shadow zones, as cast or relative shadows in this case, which are the projections of shadows on the surface of a body. In general, a cast or relative shadow, mentioned above, is distinguished from a "proper" shadow, the latter corresponding to the shadow of a body projected into space and visible for an observer on this same body. The distinction can be illustrated by the shadow of a person facing the dawn, which projects a cast or relative shadow behind his back, for example on the ground surface, but where the back itself also constitutes a "proper" shadow zone.

Another well-known approach is based on the spectral and structural characteristics of shadows, i.e. their colors and shapes. This approach enables the identification equally of cast shadows and proper shadows. It includes the digital segmentation of the image into finite color elements, from which is carried out an analysis of the radiation emitted by the image objects. One of the disadvantages of this technique is the fact that it is based on the structural characteristics of shadows, and that it requires digital segmentation of the image. In particular this means, using long and complex image processing, which requires improved calculation means and which does not always produce satisfactory results.

Therefore, there is a need to improve the quality of digital processing enabling the identification of the shadows in an image, and to achieve this using simple and rapid processes.

SUMMARY OF THE INVENTION

Thus, it is an object of the invention to propose a process which does not have the previously mentioned disadvantages, that enables the identification of the shadows in an image, and is capable of being implemented easily using simple and rapid digital processing means.

The invention includes a process of shadow identification in an image comprising a set of points that can be located in the plane of the image. Each image point is associated with a color and brightness, with the color being defined by chromatic components that can be located in the color space of the acquisition system. The brightness is determinable from the chromatic components, characterized in that, for each image point:

the brightness is determined;

color standardization is carried out, leading to standardized chromatic components r, g, b;

a chromatic brightness is determined from the standardized chromatic components r, g, b; and the chromatic brightness is compared with the brightness to identify the presence of a shadow on the relevant image point.

The invention also relates to images produced using digital processing between a starting image and a mapping or mask of this starting image, with the mapping or mask having been obtained by the process previously presented.

Therefore, the present invention relates to a process of identifying a shadow in a digital image, with the digital image comprising a set of image points that can be located in a plane of the image, and each image point being associated with a color and brightness. The color is defined by chromatic components that are locatable in a color space of an acquisition system, and the brightness is determinable from the chromatic components, wherein for each image point the process comprises the steps of: determining a brightness; performing a color standardization to provide standardized chromatic components r, g, b; determining a chromatic brightness from the standardized chromatic components r, g, b; and comparing the chromatic brightness with the brightness of each image point to identify a presence of a shadow on a relevant image point.

Various other characteristics emerge from the description made below which sometimes refers to the annexed drawings illustrating, as non-limiting examples, the digital methods used.

DETAILED DESCRIPTION OF THE INVENTION

The identification of the shadows in question can, in general, be understood as being the recognition of the presence or not of a shadow on each image point. This recognition can be accompanied by a point by point encoding of the image, giving information of the presence or not of a shadow. This encoding is useful for producing a mapping of the shadows of the image, as well as producing a mask of the shadowed zones or non-shadowed zones.

The image from which the shadow identification is produced can be a digital photograph 1 (FIG. 5) or an image digitized from a photograph. The photographed view preferably comprises bodies that are colored and illuminated by a direct light source, as well as a source of ambient light; both light sources having the same spectral composition. Views photographed in daylight, on a sunny day usually fulfill these criteria.

The image 1 (FIG. 5) of the invention comprises a set of image points that can be defined by the resolution of the acquisition system used; the latter can be, for example, a camera or scanner. Most often the image points are the pixels defined by the digital image or digitized image.

The image points can also be pixel groups representing the image with a lower resolution, which enables faster digital processing. In such a case, it can be useful to carry out preliminary processing in order to determine the average color of each of these points. According to another aspect, these points can be the finite elements of the image, for example following its segmentation into color zones.

The image points must also be locatable in its plane, which enables indexing to be carried out for later digital processing. Most often, these points are locatable using their coordinates in a system made up by two axes parallel to the image plane, and preferably orthogonal.

Figure 1:
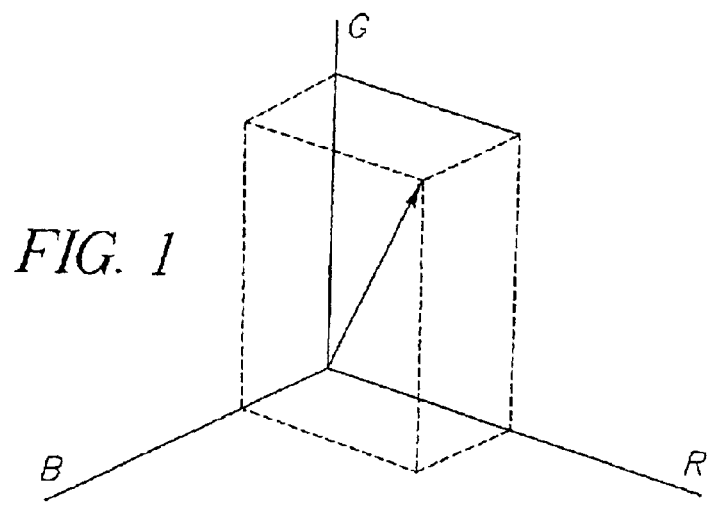
FIG. 1 is a graphic representation in space, of the color of a point according to its chromatic components, in a color space system of the acquisition system having three axes corresponding to the primary colors, the color of a point being represented by a vector.

According to the invention, each point of an image is associated with a color defined by the chromatic components R, G, B locatable in the RGB color space of the acquisition system. The R, G, B chromatic components of a color are generally the relative weight of each of the three primary colors making up the color. As shown in FIG. 1, the color of a point can be represented by a vector, having for an application point the origin of the three axes corresponding to the primary colors, and for an end, a point located by the R, G, B chromatic components of the color on these three axes.

There are several types of RGB color space that vary according to the acquisition system used. They are differentiated from each other by the wavelengths of their associated primary colors as well as by the reference white. These color spaces are also called "physical color spaces". Standards have been defined, such as the CIE (Commission Internationale de l'Eclairage) for which the said primary colors have wavelengths of 700 nm, 546.1 nm and 435.8 nm.

According to the present invention, each image point is associated with a brightness that can be determined from the chromatic components R, G, B of the color of the point.

Figure 2:
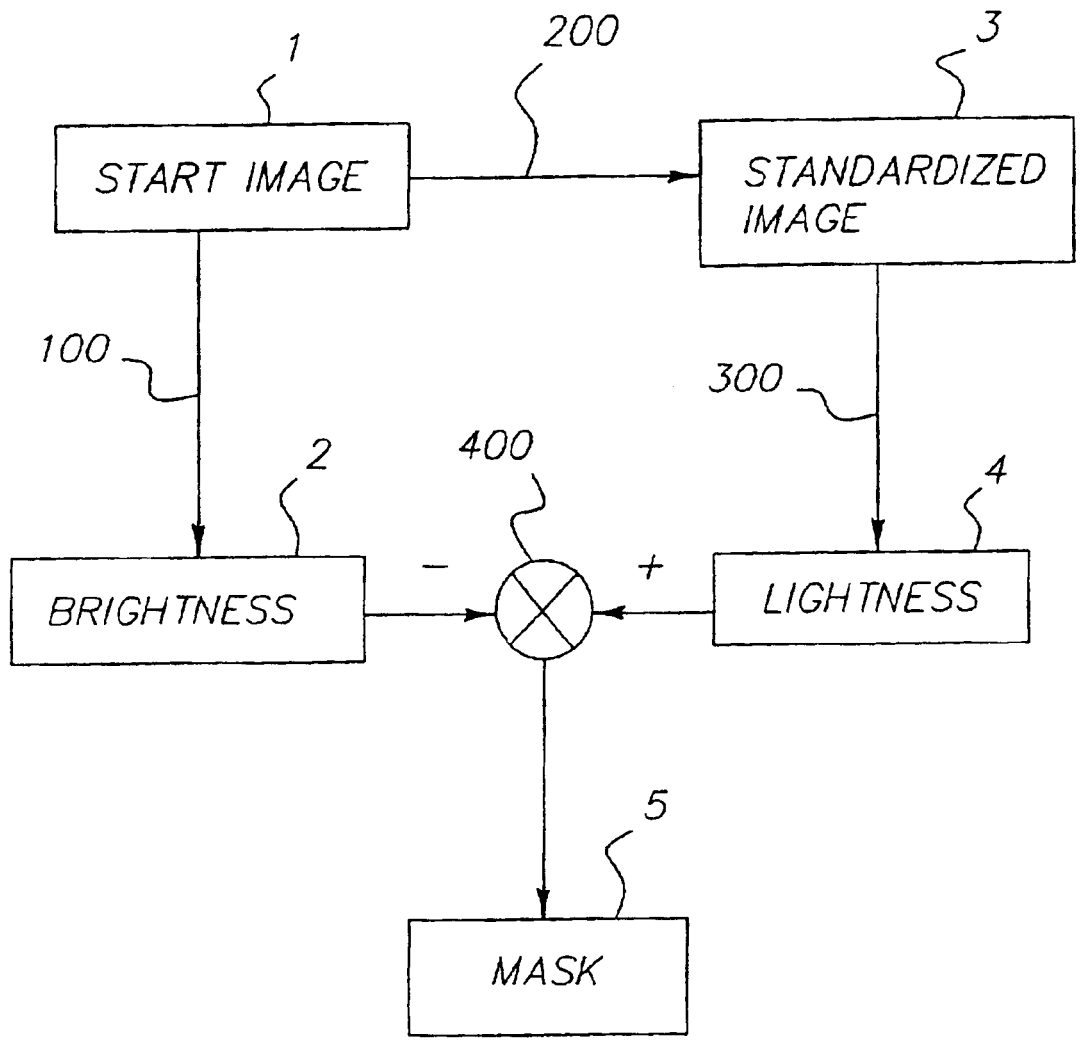
FIG. 2 illustrates the various steps of the process of the invention.

As shown in FIG. 2, the invention process comprises at least five steps that are implemented from a starting image 1, such as defined above.

According to the first Step 100 of the invention process, the brightness 2 is determined for each image point 1.

Generally, the brightness of a point is determined by a component Y in an XYZ color space system, the color of the point having X, Y, Z components in this system. The brightness of a point can be determined using a linear combination of the chromatic components R, G, B of the color of the point.

The relevant XYZ color space is preferably defined independently of the material characteristics related to the acquisition system's physical constraints. This XYZ color space can be, especially, a standardized color space, e.g. defined according to the CE standard or others known as "Recommendation 601", "Recommendation 709", etc.

According to the second Step 200 of the invention process, color standardization is carried out for each image point, thus leading to the standardized chromatic components x, y, z. This color standardization step can lead to a standardized image 3.

Preferably, color standardization comprises the following steps:

the X, Y, Z components of the color are determined in a three-dimensional system of a standardized XYZ color space;

the x, y, z components of the standardized color in the three-dimensional system of the standardized XYZ color space are calculated by dividing the X, Y, Z components previously calculated, respectively by the sum of the latter; and the chromatic components r, g, b of the standardized color in the chromatic RGB color space are determined from the x, y, z components of the standardized color previously calculated.

The three-dimensional system of the standardized XYZ color space in which the color standardization is carried out can be defined by a transfer matrix for going from the RGB color space to the standardized XYZ color space, as well as by a matrix for a transfer in the other direction. The standardized XYZ color space is generally defined according to a given standard, such as, for example, the CIE standard, or others known as "Recommendation 601", "Recommendation 709", etc.

In the case of the CE standard, the transfer matrices of a physical RGB color space to a standardized XYZ color space, in both directions, can be expressed as follows:

$$\begin{pmatrix} X \\ Y \\ Z \end{pmatrix} = \begin{pmatrix} 0.49 & 0.31 & 0.2 \\ 0.1769 & 0.8124 & 0.01063 \\ 0 & 0.01 & 0.99 \end{pmatrix} * \begin{pmatrix} R \\ G \\ B \end{pmatrix}$$

$$\begin{pmatrix} R \\ G \\ B \end{pmatrix} = \begin{pmatrix} 2.3647 & -0.896 & -0.468 \\ -0.5151 & 1.426 & 0.0887 \\ 0.005 & -0.0144 & 1.009 \end{pmatrix} * \begin{pmatrix} X \\ Y \\ Z \end{pmatrix}$$

The three-dimensional system of the standardized XYZ color space can be orthogonal, i.e. the three axes locating the X, Y, Z components are orthogonal. The three-dimensional system of the standardized color space can generally enable the definition of the colors independently from the material characteristics of the acquisition system used.

According to the second step of the color standardization, the x, y, z components of the standardized color in the three-dimensional system of the standardized XYZ color space can be calculated by dividing the X, Y, Z components calculated during the first standardization step, respectively by the sum of the latter. Standardized colors with x, y, z components can be represented graphically in a plane, called the chromatic plane, defined by the equation x+y+z=1. The projection of the chromatic triangle, defined below, corresponding to the acquisition system, can be represented graphically in the same chromatic plane. This chromatic triangle, also known as the color gamut, has summits through which pass the axes of the physical RGB color space system. The color gamut enables the definition of all the colors that can be produced by the additive process of the primary colors of the acquisition system.

Figure 3:
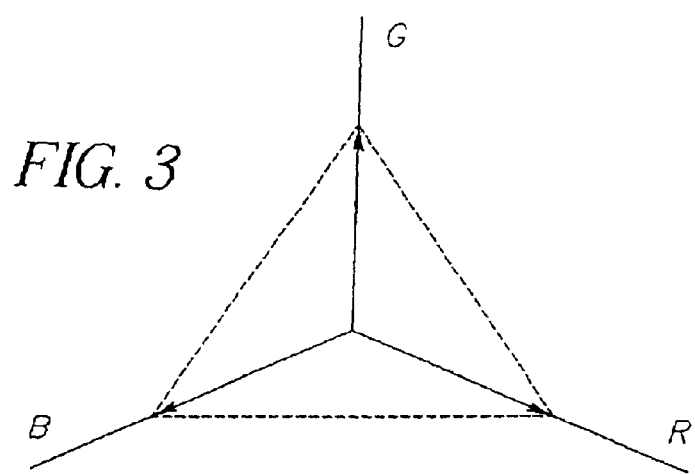
FIG. 3 is a graphic representation in a standardized XYZ color space system, of a triangle commonly called chromatic triangle or color gamut.

As shown in FIG. 3, the chromatic triangle is described by three points that correspond to the wavelengths of the primary colors of the RGB color space of the acquisition system. According to the third step of the standardization, the chromatic components r, g, b of the standardized color in the chromatic RGB color space are determined from the x, y, z components of the standardized color calculated during the second step of the standardization. The new chromatic components r, g, b in the physical RGB color space can thus be calculated from the standardized components x y, z using a transfer matrix of the standardized XYZ color space to the physical RGB color space.

Figure 4:
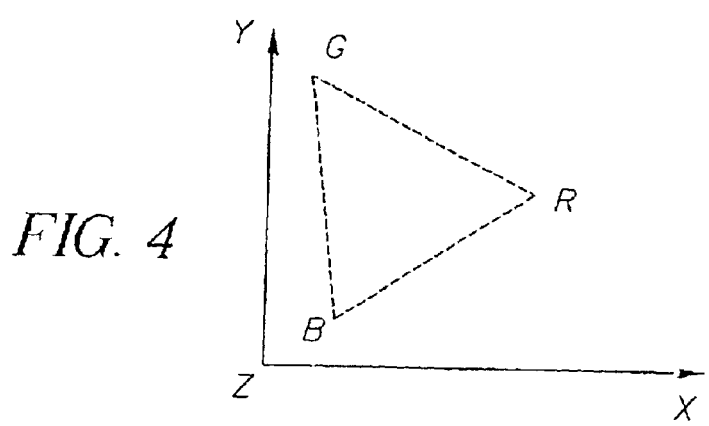
FIG. 4 is a chromatic diagram representing the chromatic plane onto which the color vectors are projected during the standardization step.

Standardization can be represented by projecting color vectors in the chromatic plan. As shown in FIG. 4, the standardized color can be represented in the limits of the projection of the chromatic triangle in the chromatic plane by the standardized components x and y.

According to the third Step 300 of the invention process, the chromatic brightness 4 of a point is determined from the standardized chromatic components r, g, b. According to a preferential embodiment, the chromatic brightness 4 of a point is, preferably, determined from the chromatic components r, g, b of the standardized color of the point, according to a process similar to the determination of the brightness.

According to the fourth Step 400 of the invention process, the chromatic brightness is compared with the brightness to identify the presence of a shadow on the relevant image point. The comparison between the chromatic brightness and the brightness can be done using the values of these parameters calculated in the previous steps, or the modified values of these parameters by means of appropriate digital processing. In general, the presence of a shadow on the relevant image point is identified if the modified or not value of the chromatic brightness is more than the brightness.

Preferably, the presence of a shadow on the relevant image point is identified if the chromatic brightness is more than the brightness. This enables the representation of the shadows in the form of a mapping or a mask 5 of the shadowed or non-shadowed zones.

Figure 5:
FIG. 5 represents a digital photograph that can be used as the starting image of the process of the invention.
Figure 6:
FIG. 6 represents an example of the mask of the non-shadowed zones of the digital photograph of FIG. 5, obtained by the process of the invention.

Processing of the image according to the invention process can enable, based on a digital color photograph as shown (in black and white) in FIG. 5, identification of the shadows and the production of a representation in mask form of the non-shadowed zones, like in FIG. 6, where only the shadow zones appear light.

Using the starting image shown in FIG. 5 and the mask associated with it, shown in FIG. 6, it is possible to make other images by digital processing, e.g. by eliminating or attenuating certain shadows on the starting image.

The invention has been described in detail with particular reference to certain preferred embodiments thereof, but it will be understood that variations and modifications can be effected within the spirit and scope of the invention.

What is claimed is:

1. A process of identifying a shadow in a digital image, the digital image comprising a set of image points that can be located in a plane of said image, each image point being associated with a color and brightness, the color being defined by chromatic components that are locatable in a color space of an acquisition system, the brightness being determinable from said chromatic components, wherein for each image point the process comprises the steps of, determining a brightness;

performing a color standardization to provide standardized chromatic components r, g, b;

determining a chromatic brightness from the standardized chromatic components r, g, b; and comparing the chromatic brightness with the brightness of each image point to identify a presence of a shadow on a relevant image point.

2. A process according to claim 1, wherein said brightness determining step comprises determining a brightness of each image point by a component Y in an XYZ color space system, a color of said point having X, Y, Z components in said system.

3. A process according to claim 2, wherein the XYZ color space is defined independently of material characteristics related to physical constraints of the acquisition system.

4. A process according to claim 2, wherein the XYZ color space is a standardized color space.

5. A process according to claim 4, wherein the standardized color space is defined according to a predetermined standard.

6. A process according to claim 1, wherein said step of performing color standardization comprises the steps of:

determining X, Y, Z components of a color in a three-dimensional system of a standardized XYZ color space;

calculating x, y, z components of the standardized color in the three-dimensional system of the standardized XYZ color space by dividing the X, Y, Z components, respectively by a sum of the X,Y,Z components; and determining the chromatic components r, g, b of the standardized color in a chromatic RGB color space from the x, y, z components of the standardized color.

7. A process according to claim 1, wherein the chromatic brightness of an image point is determined from the chromatic components r, g, b, of the standardized color according to a process similar to the determination of the brightness.

8. A process according to claim 1, wherein the presence of a shadow on the relevant image point is identified if the chromatic brightness is more than the brightness.

9. A process according to claim 1, wherein the identification of the presence of a shadow for each image point enables a mapping of the shadow in the image to be produced.

10. An image produced using digital processing between a starting image and a mapping or mask of the starting image, the mapping or mask being obtained by a process according to claim 9.

11. A process according to claim 1, wherein the identification of the presence of a shadow for each image point enables a mask of shadowed and non-shadowed zones in the image to be produced.

12. An image produce using digital processing between a starting image and a mapping mask of the starting image, the mapping or mask being obtained by a process according to claim 11.

* * * * *